(12) United States Patent
Huang

(10) Patent No.: US 8,633,804 B2
(45) Date of Patent: Jan. 21, 2014

(54) RFID SYSTEM WITH RFID READERS AND OPERATING METHOD THEREOF

(75) Inventor: Chih-Hua Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 749 days.

(21) Appl. No.: 12/704,760

(22) Filed: Feb. 12, 2010

(65) Prior Publication Data

US 2010/0225445 A1    Sep. 9, 2010

(30) Foreign Application Priority Data

Mar. 5, 2009 (TW) ................................ 98107135 A

(51) Int. Cl.
*H04Q 5/22* (2006.01)

(52) U.S. Cl.
USPC .......................... 340/10.1; 340/10.2; 700/295

(58) Field of Classification Search
USPC ................................. 340/10.1, 10.2; 700/295
See application file for complete search history.

(56) References Cited

U.S. PATENT DOCUMENTS

| 2006/0022800 A1* | 2/2006 | Krishna et al. ................ 340/10.2 |
| 2007/0083294 A1* | 4/2007 | Bruno ............................ 700/295 |
| 2009/0050697 A1* | 2/2009 | Sparks et al. ............... 235/382.5 |

* cited by examiner

*Primary Examiner* — Brian Zimmerman
*Assistant Examiner* — Omer S Khan
(74) *Attorney, Agent, or Firm* — Edell, Shapiro & Finnan, LLC

(57) ABSTRACT

A radio frequency identification (RFID) system includes a host, a signal translating device and a plurality of RFID readers. The signal translating device includes a network receiving/transmitting module and an RFID receiving/transmitting module. The network receiving/transmitting module receives a control signal via a network and generates a translated signal according to the control signal. The RFID receiving/transmitting module generates an access command according to the translated signal, and transmits the access command via an RF signal. The plurality of RFID readers selectively generates an access signal or a relay access command according to the access command.

16 Claims, 4 Drawing Sheets

RFID SYSTEM WITH RFID READERS AND OPERATING METHOD THEREOF

CROSS REFERENCE TO RELATED PATENT APPLICATION

This patent application is based on Taiwan, R.O.C. patent application No. 98107135 filed on Mar. 5, 2009.

FIELD OF THE INVENTION

The present invention relates to radio frequency identification (RFID), and more particularly, to an RFID system with RFID readers and an operating method thereof.

BACKGROUND OF THE INVENTION

RFID is a non-contact, automatic identification technology including a tag and a reader. A main operating principle of RFID technology is that a small RFID tag chip is set on or embedded in a product, and product information stored in the RFID tag chip is transmitted via RF signals to an RFID tag reader for tracking. Since manual operation is not required in implementing RFID technology, RFID technology is suitable for factory automation, goods sales, toll systems and vehicle identification.

RFID technology is sometimes integrated with a network, such as the Internet, to provide data transmission. FIG. 1 shows a schematic diagram of a wireless network architecture comprising RFID tag readers in the prior art. In this architecture, since each of RFID tag readers 4 to 6 is directly coupled to a network and communicates with a host 9 via the network, each of the RFID tag readers 4 to 6 needs extra network units and higher calculating or processing capabilities in addition to existing RFID tag access units to comply with complicated and fast network transmission protocols (e.g., the TCP/IP network protocol).

Thus, as a result of the architecture above, each of the RFID tag readers may become a complicated and high cost terminal device. Moreover, as the number of RFID tag readers in this architecture becomes larger, the overall cost is multiplied.

Therefore, an object of the present invention is to provide an RFID system with RFID readers and an operating method thereof to solve the foregoing problem.

SUMMARY OF THE INVENTION

An RFID system is provided according to a first embodiment of the present invention. The RFID system comprises a host, a signal translating device and a plurality of RFID readers. The signal translating device comprises a network receiving/transmitting module and an RFID receiving/transmitting module. When the host generates a control signal, the network receiving/transmitting module receives the control signal via a network and generates a translated signal according to the control signal. The RFID receiving/transmitting module generates an access command according to the translated signal, and transmits the access command via an RF signal. The RFID readers selectively generate an access signal or a relay access command according to the access command.

In this embodiment, the network is a wired network or a wireless network, and the RFID readers are ultra high frequency (UHF) RFID readers and are arranged according to a predetermined sequence. Each of the RFID readers lies within a signal transmission range of a previous RFID reader.

A method for operating an RFID system is provided according to a second embodiment of the present invention. The RFID method employs a host and a plurality of RFID readers. The method comprises generating a control signal by the host; receiving the control signal via a network and generating a translated signal according to the control signal; generating an access command according to the translated signal and transmitting the access command via an RF signal; and selectively generating an access signal or a relay access command by the RFID readers according to the access command.

A signal translating device applied to an RFID system is provided according to a third embodiment. The signal translating device comprises a network receiving/transmitting module and an RFID receiving/transmitting module. The network receiving/transmitting module receives a control signal via a network, and generates a translated signal according to the control signal. The RFID receiving/transmitting module, coupled to the network receiving/transmitting module, generates an access command according to the translated signal and transmits the access command via an RF signal.

In conclusion, an RFID system according to the present invention not only simplifies architecture complexity of RFID readers comprised in the RFID system, but may also drastically reduce production costs of the RFID system.

The advantages and spirit related to the present invention can be further understood via the following detailed description and drawings.

DETAILED DESCRIPTION OF THE PREFERRED EMBODIMENT

A main object of the present invention is to provide an RFID system and an operating method thereof. A difference between the RFID system according to the invention and a conventional RFID network architecture is that RFID readers comprised in the RFID system need neither extra network units nor higher calculation or processing capabilities to communicate with a host via a network. Accordingly, the RFID system according to the present invention is capable of reducing architecture complexity and saving product cost.

Figure 1:
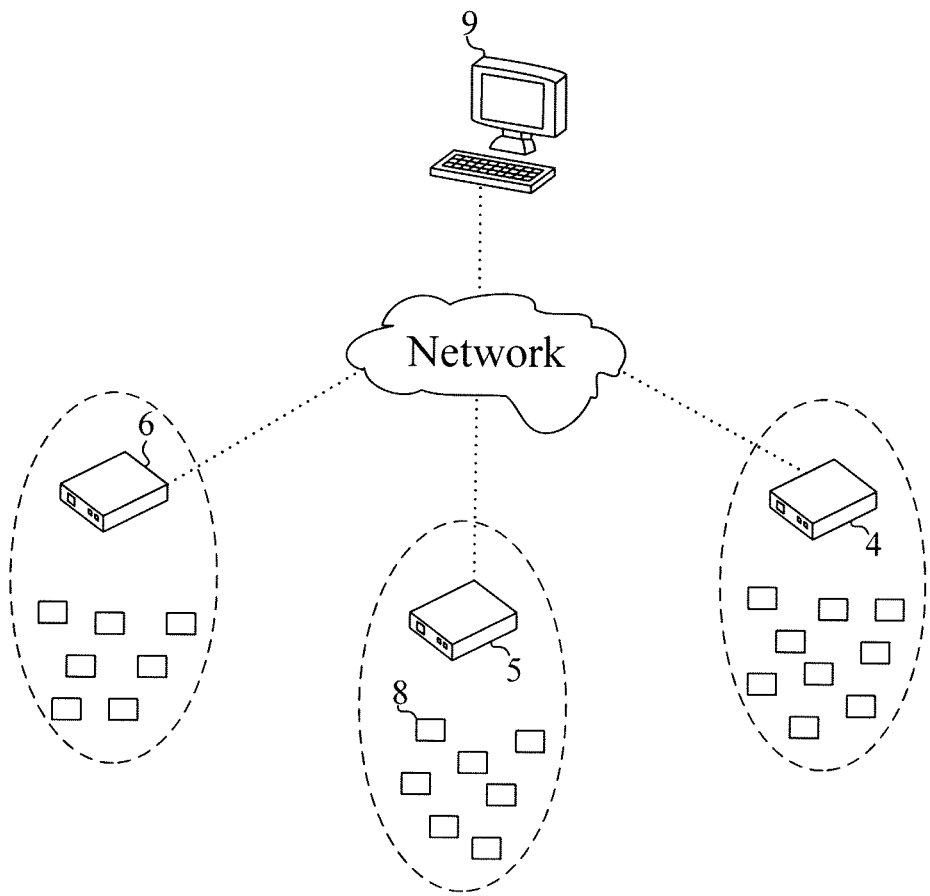
FIG. 1 is a schematic diagram of a wireless network architecture comprising RFID tag readers in the prior art.
Figure 2:
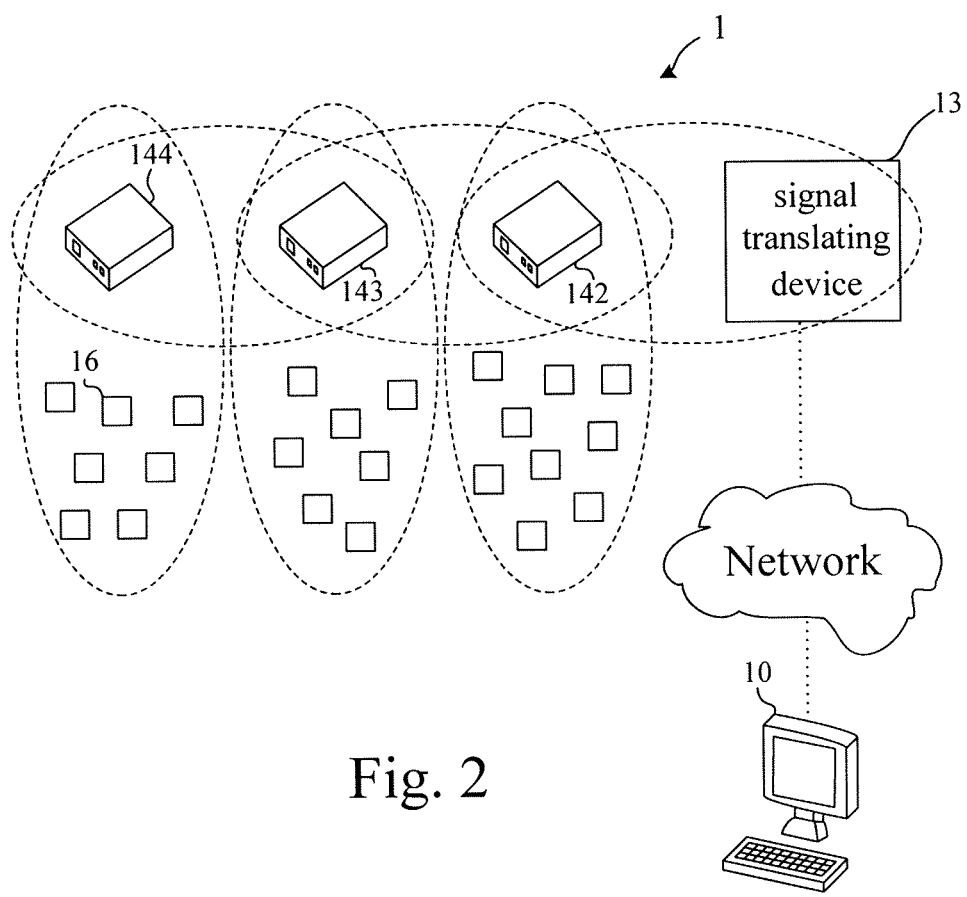
FIG. 2 is a schematic diagram of an RFID system in accordance with a first embodiment of the present invention.

Referring to FIG. 2, an RFID system is provided in accordance with a first embodiment of the present invention. In this embodiment, the RFID system comprises three UHF RFID readers 142 to 144 with a signal transmission distance of several meters.

As shown in FIG. 2, the RFID system 1 comprises a host 10, a signal translating device 13 and RFID readers 142 to 144. In this embodiment, the RFID readers 142 to 144 are arranged according to a predetermined sequence, and each of the RFID readers lays within signal transmission ranges of adjacent RFID readers. For example, the RFID reader 143 lays within signal transmission ranges of the RFID readers 142 and 144. A practical operating situation of an RFID system 1 is described in detail by describing the transmission of a control command from the host 10 to the RFID reader 144 as an example.

The host 10 first generates a control signal. In this embodiment, the control signal comprises an identification code corresponding to an object to which the host 10 wishes to transmit the control signal, i.e., the RFID reader 143. After the host 10 generates the control signal, the control signal is transmitted to the signal translating device 13 via the network.

Figure 3:
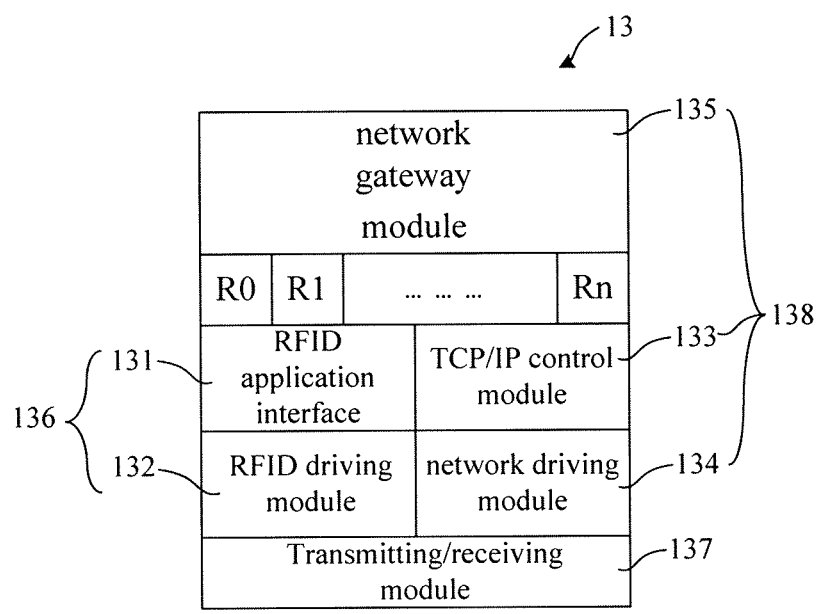
FIG. 3 is a schematic diagram of an architecture of a signal translating device 13 illustrated in FIG. 2.

FIG. 3 shows a schematic diagram of an architecture of the signal translating device 13. In this embodiment, the signal translating device 13 comprises an RFID receiving/transmitting module 136 and a network receiving/transmitting module 138. The network receiving/transmitting module 138 further comprises a network driving module 134, a network transmitting protocol control module 133 (i.e., a TCP/IP control module 133) and a network gateway module 135. The RFID receiving/transmitting module 136 comprises an RFID application interface 131 and an RFID driving module 132. The RFID application interface 131 communicates with and transmits data to the RFID driving module 132 via a receiving/transmitting module 137 and other RFID tag readers of the RFID system 1. The TCP/IP control module 133 and the network driving module 134 are coupled to a network and communicate with the host 10 via the network.

The network gateway module 135 is provided with a translation capability that translates formats between different signals. In this embodiment, the network gateway module 135 translates formats between Internet signals and RFID signals. In practice, the network gateway module 135 performs signal format translation according to a translation table.

The host 10 is a server or a database, and the network is a wireless network (e.g., an 802.11 network) or a wired network (e.g. an Ethernet). The signal translating device 13 mainly provides the translation function between different signal formats. Therefore, when receiving the control signal, the signal translating device 13 generates a translated signal. It is to be noted that, the translated signal is an RF signal to be transmitted to the RFID readers 142 to 144. In addition, the translated signal still comprises the identification code; the RFID readers of the present invention are not limited to the foregoing RFID readers, however.

Referring to FIG. 3, in this embodiment, the RFID receiving/transmitting module 136 comprises the RFID application interface 131 and the RFID driving module 132. When the network receiving/transmitting module 138 receives a signal via the network from the host 10 and generates the translated signal, the RFID application interface 131 receives the translated signal from the network receiving/transmitting module 138. The RFID driving module 132, controlled by the RFID application interface 131, drives the receiving/transmitting module 137 according to the translated signal to transmit an access command via an RF signal.

When receiving the access command, the RFID reader 142 determines whether the identification code comprised in the access command corresponds to the RFID reader 142. When the determination result is positive, it means that the access command is meant to be transmitted to the RFID reader 142, which then performs operations (e.g., transmitting an access signal for accessing a tag) according to the access command. However, since the identification code comprised in the translated signal corresponds to the RFID reader 143, the determination result of the RFID reader 142 is negative, i.e., a destination of the access command is not the RFID reader 142; thus the RFID reader 142 transmits the access command via the RF signal.

In a practical application, the network receiving/transmitting module 138 comprises the TCP/IP control module 133 and the network gateway module 135. The TCP/IP control module 133 receives and processes the control signal to generate an Internet protocol address, and the network gateway module 135 generates a relay signal according to the Internet protocol address and a look-up table. For example, the TCP/IP control module 133 virtualizes N Internet protocol (IP) addresses corresponding to the RFID readers, where N is the number of the RFID readers (3 in this embodiment). The look-up table records relationships between the IP addresses and the RFID readers.

With respect to the host 10, the signal translating device 13 provides virtual RFID readers corresponding to the RFID readers 142 to 144 of the RFID system 1. More specifically, in this embodiment, the host 10, instead of directly communicating with the RFID readers 142 to 144, communicates with virtual RFID readers R0 to Rn of the signal translating device 13. The virtual RFID readers R0 to R2 respectively correspond to the RFID readers 142 to 144. Communication messages between the virtual RFID readers R0 to R2 and the host 10 are transmitted via the network gateway module 135, the TCP/IP control module 133, the network driving module 134 and the receiving/transmitting module 137.

Since the signal translating device 13 comprises the virtual RFID readers R0 to R2, and each of which has an IP address on the Internet to communicate with the host 10, the signal translating device 13 simultaneously comprises multiple IP addresses, and distributes the IP addresses to the virtual RFID readers R0 to R2 on a one-to-one basis. In practice, the signal translating device 13 simultaneously designates multiple IP addresses using IP aliasing.

As mentioned above, when the RFID reader 142 transmits an RF signal comprising the access command, since the RFID reader 143 lies within the signal transmission range of the RFID reader 142, the RFID reader 143 is capable of receiving the RF signal comprising the access command from the RFID reader 142.

Since the identification code comprised in the RF signal corresponds to the RFID reader 143, the RFID reader 143 determines that the RF signal comprising the access command is meant to be transmitted to the RFID reader 143. Supposing that the access command comprises a command for accessing information of a predetermined tag, the RFID reader 143 transmits an access signal to the predetermined tag according to the access command in order to access the information of the predetermined tag.

The foregoing description discloses a detailed process of transmitting a control command from the host 10 to the RFID reader 143. A practical operating situation of another signal transmission direction within the RFID system 1 is described by taking tag information transmission from the RFID reader 144 to the host 10 as an example.

When accessing tag information from a target RFID tag 16, the RFID reader 144 generates a tag signal comprising the tag information and an identification code. Since the RFID reader 144 wishes to transmit the tag signal to the host 10, the identification code corresponds to the host 10.

Next, the RFID reader 144 transmits the tag signal. Since the RFID reader 143 lies within the signal transmission range of the RFID reader 144, the RFID reader 143 receives the tag signal and determines whether the identification code comprised in the tag signal corresponds to the RFID reader 143. Since it is known that the identification code corresponds to the host 10, the determination result of the RFID reader 143 is negative, i.e., the identification code does not correspond to the RFID reader 143; thus the RFID reader 143 relays the tag signal to other RFID readers.

Likewise, the tag signal is transmitted in sequence from the RFID reader 143 to the RFID reader 142. When it is determined that the identification code comprised in the tag signal does not correspond to the RFID reader 142, the RFID reader 142 transmits the tag signal to the signal translating device 13.

When receiving the tag signal, the signal translating device 13 translates the tag signal from an RF signal format to a format acceptable to the host 10. It is to be noted that, the tag signal in the translated format still comprises the tag information and the identification code. The network receiving/transmitting module 12 transmits the tag signal to the host 10 via a network. When receiving the tag signal, the host 10 determines that the identification code comprised in the tag signal corresponds to the host 10, so that the tag information, which is associated with the target RFID tag 16 and is transmitted from the RFID reader 144, is smoothly obtained.

A method for operating an RFID system is provided according to a second embodiment of the present invention. The RFID method employs a host and a plurality of RFID readers. In this embodiment, the plurality of RFID readers are UHF tag readers, which are arranged according to a predetermined sequence and have a signal transmission distance of several meters, and each of the RFID readers lies within signal transmission ranges of adjacent RFID readers; however, the RFID readers of the present invention are not limited to the foregoing RFID readers.

Figure 4:
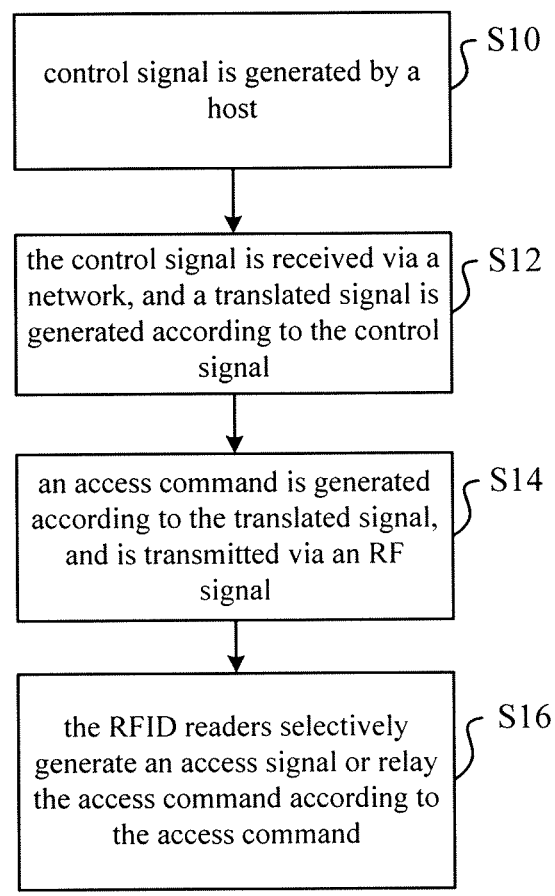
FIG. 4 is a flow chart of a method for operating an RFID system in accordance with a second embodiment of the present invention.

FIG. 4 shows a flow chart of a method for the RFID system. The operating method begins with Step S10. In Step S10, a control signal is generated by a host. In this embodiment, the control signal comprises an identification code and a command, or even access data, and the identification code corresponds to a target RFID reader to which the host wishes to transmit the control signal.

In Step S12, the control signal is received via a network, and a translated signal is generated according to the control signal. Accordingly, an original signal format of the control signal is translated to a signal format acceptable to RFID readers, and the translated signal still comprises the identification and the command, or even the access data. In practice, the network may be a wireless network or a wired network. In Step S14, an access command is generated according to the translated signal, and is transmitted via an RF signal. In Step S16, the RFID readers selectively generate an access signal or relay the access command according to the access command.

In a practical application, when one of the RFID readers receives the RF signal comprising the access command, the RFID reader determines whether the access command corresponds to the RFID reader itself. When the determination result is positive, it means that the RF signal comprising the access command is meant to be transmitted to the RFID reader, and thus the RFID reader performs operations (e.g., transmitting an access signal for accessing a tag) according to the access command.

When the determination result is negative, it means that the RF signal comprising the access command is not meant to be transmitted to the RFID reader, and the RFID reader transmits the RF signal. Since each of the RFID readers lays within signal transmission ranges of adjacent RFID readers, the RF signal comprising the access command is transmitted in sequence to a target RFID reader.

In the same spirit, when one RFID reader of the RFID system wishes to transmit tag information to the host, the RFID reader transmits the tag information in a sequence reverse to the predetermined sequence to a predetermined RFID reader, and translates the tag information to translated tag information in a format acceptable to the host. After that, the translated tag information is transmitted to the host via the network.

In conclusion, a difference between the RFID system provided by the present invention and a conventional RFID network architecture is that RFID readers employed in the RFID system need neither extra network units nor higher processing capabilities to communicate with a host via a network. Accordingly, the RFID system provided by the present invention not only simplifies architecture complexity of the RFID readers, but may also drastically reduces production cost of the RFID system.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency identification (RFID) system, comprising:
 a host, for generating a control signal comprising an identification code;
 a signal translating device, comprising:
  a network receiving/transmitting module, receiving the control signal via a network and generating a translated signal according to the control signal;
  an RFID receiving/transmitting module, coupled to the network receiving/transmitting module, for generating an access command according to the translated signal and transmitting the access command via an RF signal; and
 a plurality of RFID readers arranged according to a predetermined sequence, comprising a first RFID reader closest to the signal translating device lying within a signal transmission range of the signal translating device and other RFID readers, each of the other RFID readers lying only within a signal transmission range of a respective previous RFID reader and a respective next RFID reader according to the predetermined sequence;
 wherein the first RFID reader receives the access command from the signal translating device and, responsive to the identification code, is configured to generate an access signal according to the access command or to relay the access command to a next RFID reader according to the predetermined sequence;
 wherein the next RFID reader receives the access code from the first RFID reader and, responsive to the identification code, is configured to generate the access signal according to the access command or to relay the access command to the respective next RFID reader according to the predetermined sequence until a target RFID reader indicated by the indication code receives the access command;
 wherein the signal translating device provides a plurality of virtual RFID readers corresponding to the RFID readers, and the host communicates with the virtual RFID readers instead of directly communicating with the RFID readers;
 wherein when one target RFID reader from the plurality of RFID readers wishes to transmit tag information to the host, the tag information is transmitted to the signal translating device in a sequence reverse to the predetermined sequence, and the signal translating device translates a format of the tag information and transmits the translated tag information to the host.

2. The RFID system as claimed in claim 1, wherein the network receiving/transmitting module further comprises:

a network transmission protocol control module, for receiving and processing the control signal to generate an Internet protocol (IP) address; and a network gateway module, coupled to the network transmission protocol control module, for generating the translated signal according to the IP address and a look-up table that records relationships between a plurality of IP addresses and the plurality of RFID readers.

3. The RFID system as claimed in claim 2, wherein the network transmission protocol control module is configured to support N IP addresses, where N is a number of the plurality of RFID readers.

4. The RFID system as claimed in claim 1, wherein when one of the RFID readers receives the access command, the RFID reader determines whether a destination of the access command is the RFID reader itself, and the RFID reader generates the access signal when the destination is the RFID reader itself or relays the access command when the destination is not the RFID reader itself.

5. The RFID system as claimed in claim 1, wherein the network is a wired network or a wireless network.

6. The RFID system as claimed in claim 1, wherein each of the RFID readers is an ultra high frequency (UHF) RFID reader.

7. The RFID system as claimed in claim 1, wherein one target RFID reader from the plurality of RFID readers receives the RF signal, the target RFID reader determines whether the RF signal corresponds to the target RFID reader and selectively transmits the RF signal according to the predetermined sequence.

8. The RFID system as claimed in claim 1, wherein the target RFID reader accesses the tag information from a target tag.

9. A method for operating an RFID system, the RFID system comprising a host and a plurality of virtual RFID readers corresponding to a plurality of RFID readers, the operating method comprising:

generating a control signal comprising an identification code by the host;

receiving the control signal via a network and generating a translated signal according to the control signal;

generating an access command according to the translated signal, and transmitting the access command via an RF signal; and controlling the plurality of RFID readers arranged according to a predetermined sequence, comprising a first RFID reader closest to a signal translating device lying within a signal transmission range of the signal translating device and other RFID readers, each of the other RFID readers lying only within a signal transmission range of a respective previous RFID reader and a respective next RFID reader according to the predetermined sequence;

wherein the first RFID reader receives the access command from the signal translating device and, responsive to the identification code, is configured to generate an access signal according to the access command or to relay the access command to a next RFID reader according to the predetermined sequence;

wherein the next RFID reader receives the access code from the first RFID reader and, responsive to the identification code, is configured to generate the access signal according to the access command or to relay the access command to the respective next RFID reader according to the predetermined sequence until a target RFID reader indicated by the indication code receives the access command;

wherein the host communicates with the plurality of virtual RFID readers instead of directly communicating with the plurality of RFID readers;

wherein when one target RFID reader from the plurality of RFID readers wishes to transmit tag information to the host, the tag information is transmitted to the signal translating device in a sequence reverse to the predetermined sequence, and the signal translating device translates a format of the tag information and transmits the translated tag information to the host.

10. The operating method as claimed in claim 9, wherein when one target RFID reader from the plurality of RFID readers receives the RF signal, the target RFID reader determines whether the RF signal corresponds to the target RFID reader itself and selectively relays the RF signal according to the predetermined sequence.

11. The operating method as claimed in claim 9, wherein the step of generating the translated signal according to the control signal comprises:

processing the control signal to generate an IP address; and generating the translated signal according to the IP address and a look-up table that records relationships between a plurality of IP addresses and the plurality of RFID readers.

12. The operating method as claimed in claim 9, wherein the network is a wired network or a wireless network.

13. A signal translating device, applied to an RFID system, the signal translating device comprising:

a network receiving/transmitting module, for receiving a control signal comprising an identification code via a network, the network using a network protocol, and generating a translated signal according to the control signal; and an RFID receiving/transmitting module, coupled to the network receiving/transmitting module, for generating an access command according to the translated signal and transmitting the access command via an RF signal, wherein the control signal is received by at least one of a plurality of virtual RFID readers within the network receiving/transmitting module, and the translated signal is not output using the network protocol used to receive the control signal;

wherein the plurality of virtual RFID readers corresponds to a plurality of RFID readers arranged according to a predetermined sequence, comprising a first RFID reader closest to the signal translating device lying within a signal transmission range of the signal translating device and other RFID readers, each of the other RFID readers lying only within a signal transmission range of a respective previous RFID reader and a respective next RFID reader according to the predetermined sequence;

wherein the first RFID reader receives the access command from the signal translating device and, responsive to the identification code, is configured to generate an access signal according to the access command or to relay the access command to a next RFID reader according to the predetermined sequence;

wherein the next RFID reader receives the access code from the first RFID reader and, responsive to the identification code, is configured to generate the access signal according to the access command or to relay the access command to the respective next RFID reader according to the predetermined sequence until a target RFID reader indicated by the indication code receives the access command;

wherein when one target RFID reader from the plurality of RFID readers wishes to transmit tag information to a host, the tag information is transmitted to the signal translating device in a sequence reverse to the predetermined sequence, and the signal translating device translates a format of the tag information and transmits the translated tag information to the host.

14. The signal translating device as claimed in claim 13, wherein a plurality of RFID readers of the RFID system selectively generates an access signal or relay the access command according to the access command.

15. The signal translating device as claimed in claim 13, wherein the RFID system comprises a plurality of RFID readers, and the network receiving/transmitting module further comprises:
   a network transmission protocol control module, for receiving and processing the control signal to generate an IP address; and
   a network gateway module, coupled to the network transmission protocol control module, for generating the translated signal according to the IP address and a lookup table that records relationships between a plurality of IP addresses and the plurality of RFID readers.

16. The signal translating device as claimed in claim 15, wherein the network transmission protocol control module is configured to support N IP addresses, where N is a number of the RFID readers.

* * * * *